United States Patent
Linsky et al.

(10) Patent No.: US 9,173,228 B2
(45) Date of Patent: Oct. 27, 2015

(54) BLUETOOTH PACKET SCHEDULING RULES FOR LTE COEXISTENCE

(75) Inventors: Joel Benjamin Linsky, San Diego, CA (US); Ashok Mantravadi, San Diego, CA (US); Jibing Wang, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 182 days.

(21) Appl. No.: 13/485,610

(22) Filed: May 31, 2012

(65) Prior Publication Data
US 2013/0016635 A1 Jan. 17, 2013

Related U.S. Application Data

(60) Provisional application No. 61/502,099, filed on Jun. 28, 2011.

(51) Int. Cl.
*H04W 72/12* (2009.01)
*H04W 84/18* (2009.01)
*H04W 88/06* (2009.01)

(52) U.S. Cl.
CPC .......... *H04W 72/1215* (2013.01); *H04W 84/18* (2013.01); *H04W 88/06* (2013.01)

(58) Field of Classification Search
CPC .............. H04W 88/06; H04W 24/02–24/04; H04W 72/04; H04W 72/08–72/10; H04W 16/14–16/16; H04W 28/04–28/048; H04W 72/02; H04W 72/1215
USPC ............. 370/254–255, 280, 329, 336–337, 370/345–350, 436–437, 442–444, 458–459, 370/468, 503
See application file for complete search history.

(56) References Cited

U.S. PATENT DOCUMENTS 6,704,346 B1 * 3/2004 Mansfield ............. 375/136
7,941,178 B2 5/2011 Guo et al.
(Continued)

FOREIGN PATENT DOCUMENTS

JP 2004328498 A 11/2004
JP 2007503733 A 2/2007
(Continued)

OTHER PUBLICATIONS

3GPP: "3rd Generation Partnership Project; Technical Specification Group Radio Access Networks; Evolved Universal Terrestrial Radio Access (E-UTRA); Study on signaling and procedure for interference avoidance for in-device coexistence; (Release 10)", 3GPP Draft; R2-106971_TR36816_V100, 20101115, Dec. 1, 2010, XP050492654.*

(Continued)

*Primary Examiner* — Michael Thier
*Assistant Examiner* — Eric Myers
(74) *Attorney, Agent, or Firm* — Seyfarth Shaw LLP

(57) ABSTRACT

To mitigate potential interference between radio access technologies (RATs) on a multi-RAT device, traffic scheduling rules may be implemented so that communications of the individual RATs are timed in a manner that reduces interference. For example, communications of a Bluetooth/WLAN RAT may be scheduled such that initial and responsive communications of the Bluetooth/WLAN RAT occur during subframes of an LTE RAT that are less likely to cause cross-RAT interference.

16 Claims, 18 Drawing Sheets

(56) References Cited

U.S. PATENT DOCUMENTS

| | | | |
|---|---|---|---|
| 2009/0081962 A1 | 3/2009 | Sohrabi | |
| 2010/0029325 A1* | 2/2010 | Wang et al. | 455/553.1 |
| 2010/0322287 A1* | 12/2010 | Truong et al. | 375/133 |
| 2011/0009060 A1* | 1/2011 | Hsu et al. | 455/41.2 |
| 2011/0009136 A1 | 1/2011 | Mantravadi et al. | |
| 2011/0243047 A1 | 10/2011 | Dayal et al. | |
| 2013/0329827 A1* | 12/2013 | Morioka et al. | 375/271 |

FOREIGN PATENT DOCUMENTS

| | | | |
|---|---|---|---|
| JP | 2008167149 A | 7/2008 | |
| JP | 2009508422 A | 2/2009 | |
| JP | 2009543404 A | 12/2009 | |
| JP | 2010524346 A | 7/2010 | |
| WO | 2010025678 A1 | 3/2010 | |
| WO | 2011006130 A1 | 1/2011 | |

OTHER PUBLICATIONS

Bluetooth, "Specification of the Bluetooth System", Covered Core Package version: 4.0, Jun. 30, 2010, vol. (0-6), pp. 1-2302.
International Search Report and Written Opinion—PCT/US2012/040520—ISA/EPO—Sep. 19, 2012.
"3rd Generation Partnership Project; Technical Specification Group Radio Access Network; Evolved Universal Terrestrial Radio Access (E-UTRA); Study on signaling and procedure for interference avoidance for in-device coexistence (Release 11)", 3GPP Standard; 3GPP TR 36.816, 3rd Generation Partnership Project (3GPP), Mobile Competence Centre; 650, Route Des Lucioles ; F-06921 Sophia-Antipolis Cedex; France, A vol. RAN WG2, No. V11.0.0, Jun. 24, 2011, pp. 1-40, XP050553600, [retrieved on Jun. 24, 2011].

* cited by examiner

BLUETOOTH PACKET SCHEDULING RULES FOR LTE COEXISTENCE

CROSS REFERENCE TO RELATED APPLICATION

The present Application for Patent claims the benefit of U.S. Provisional Application No. 61/502,099 filed on Jun. 28, 2011, in the names of Linsky et al., and assigned to the assignee hereof, the disclosure of which is hereby expressly incorporated herein by reference in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), CDMA2000, WiMAX, WLAN (e.g., Wi-Fi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (Wi-Fi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

Offered is a method for wireless communications. The method includes determining available communication resources for a first radio access technology according to a timing configuration of a second radio access technology. The method also includes scheduling communications of the first radio access technology in accordance with a traffic scheduling rule selected based on the available communication resources and a current radio frequency interference condition between the first and second radio access technologies.

Offered is an apparatus for operation in a wireless communication network. The apparatus includes a memory and a processor(s) coupled to the memory. The processor(s) is configured to determine available communication resources for a first radio access technology according to a timing configuration of a second radio access technology. The processor(s)

is also configured to schedule communications of the first radio access technology in accordance with a traffic scheduling rule selected based on the available communication resources and a current radio frequency interference condition between the first and second radio access technologies.

Offered is a computer program product configured for wireless communication. The computer program product includes a computer-readable medium having non-transitory program code recorded thereon. The program code includes program code to determine available communication resources for a first radio access technology according to a timing configuration of a second radio access technology. The program code also includes program code to schedule communications of the first radio access technology in accordance with a traffic scheduling rule selected based on the available communication resources and a current radio frequency interference condition between the first and second radio access technologies.

Offered is an apparatus operable in a wireless communication system. The apparatus includes means for determining available communication resources for a first radio access technology according to a timing configuration of a second radio access technology. The apparatus also includes means for scheduling communications of the first radio access technology in accordance with a traffic scheduling rule selected based on the available communication resources and a current radio frequency interference condition between the first and second radio access technologies.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). In one aspect of the disclosure, mitigation of potential interference is achieved by aligning the timing of communication by a Bluetooth radio with communication by an LTE radio of a multi-radio UE. Aligning may include frame alignment, but may also include timing communications of a first radio access technology (RAT) according to various traffic scheduling rules to reduce interference between the first RAT and other RATs.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash- OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Figure 1:
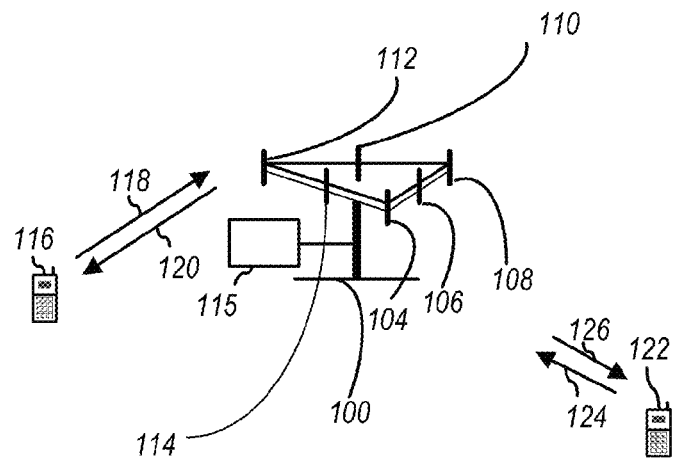
FIG. 1 illustrates a multiple access wireless communication system according to one aspect.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
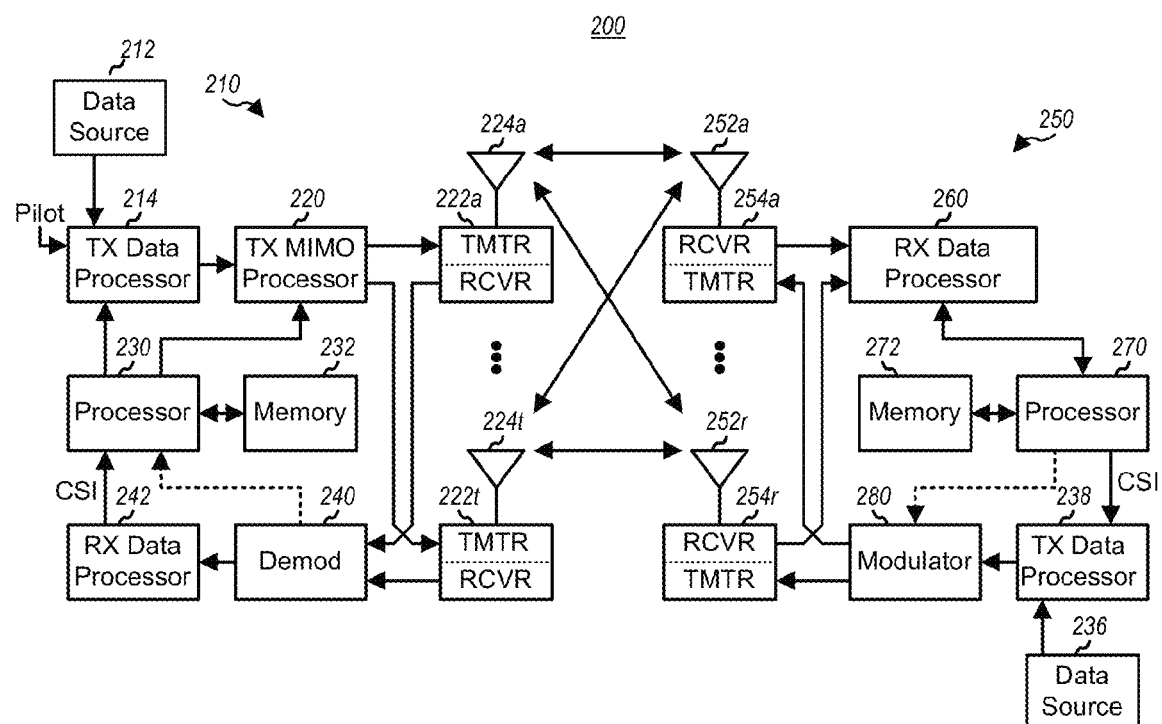
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and up-converts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
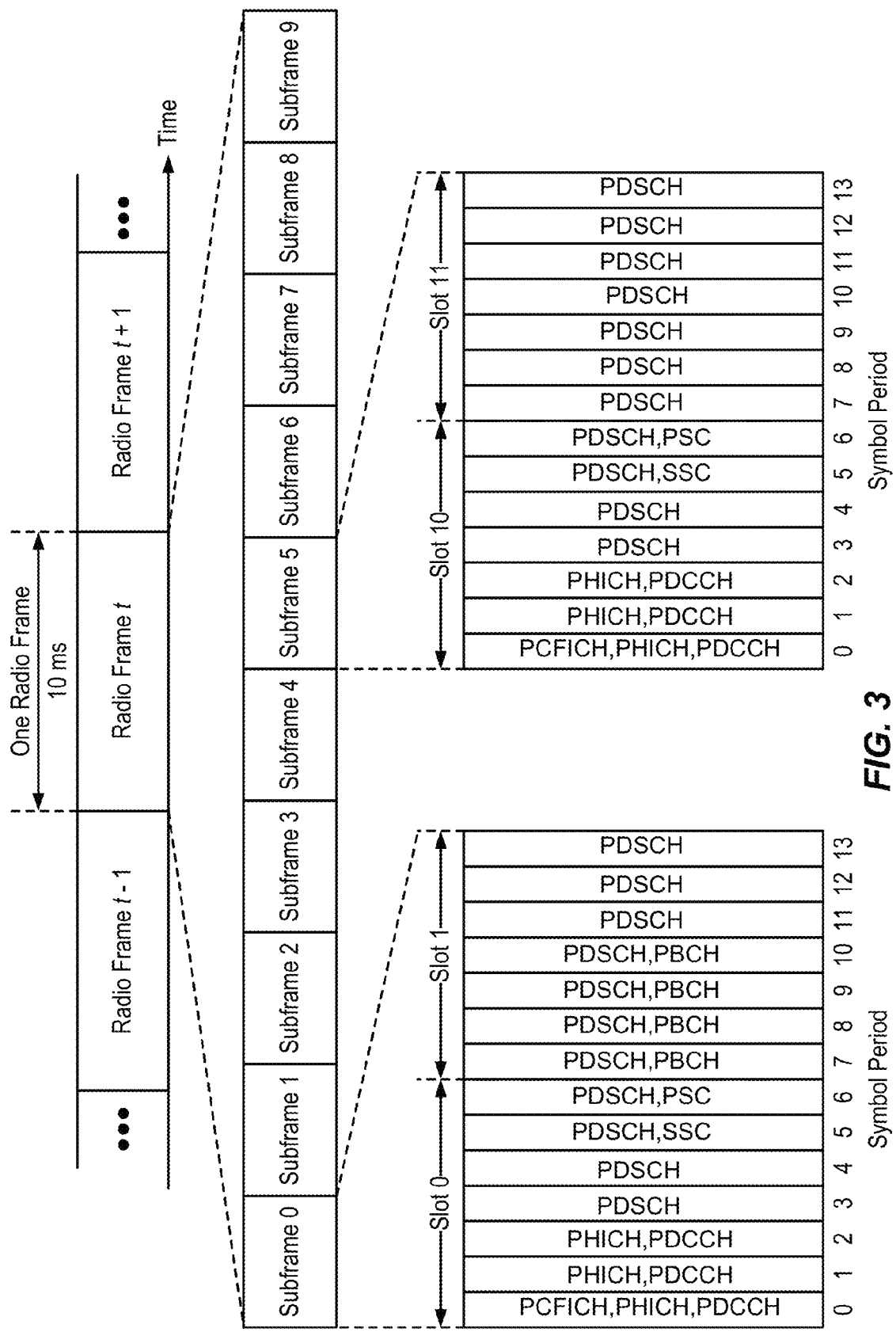
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
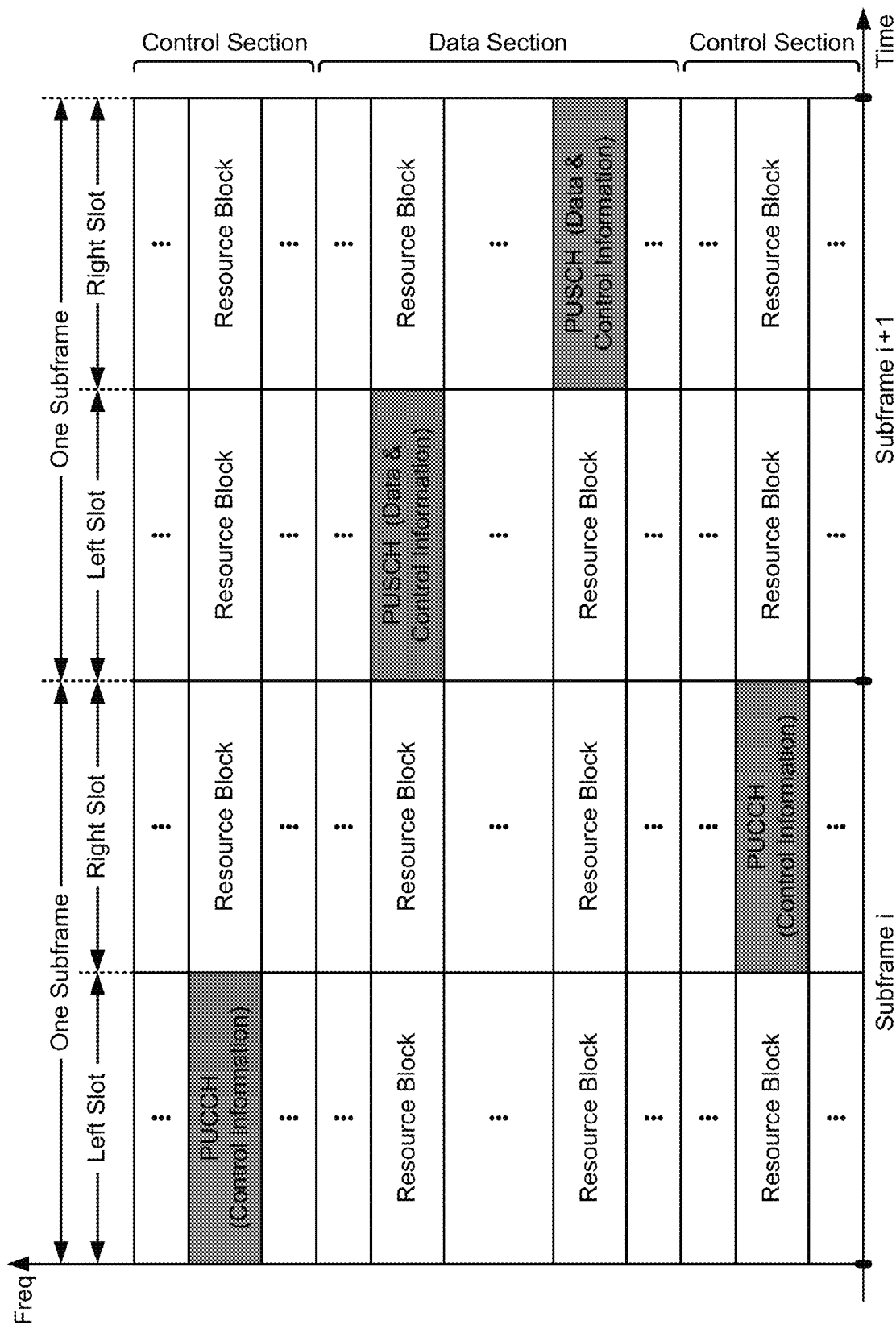
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH)

on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
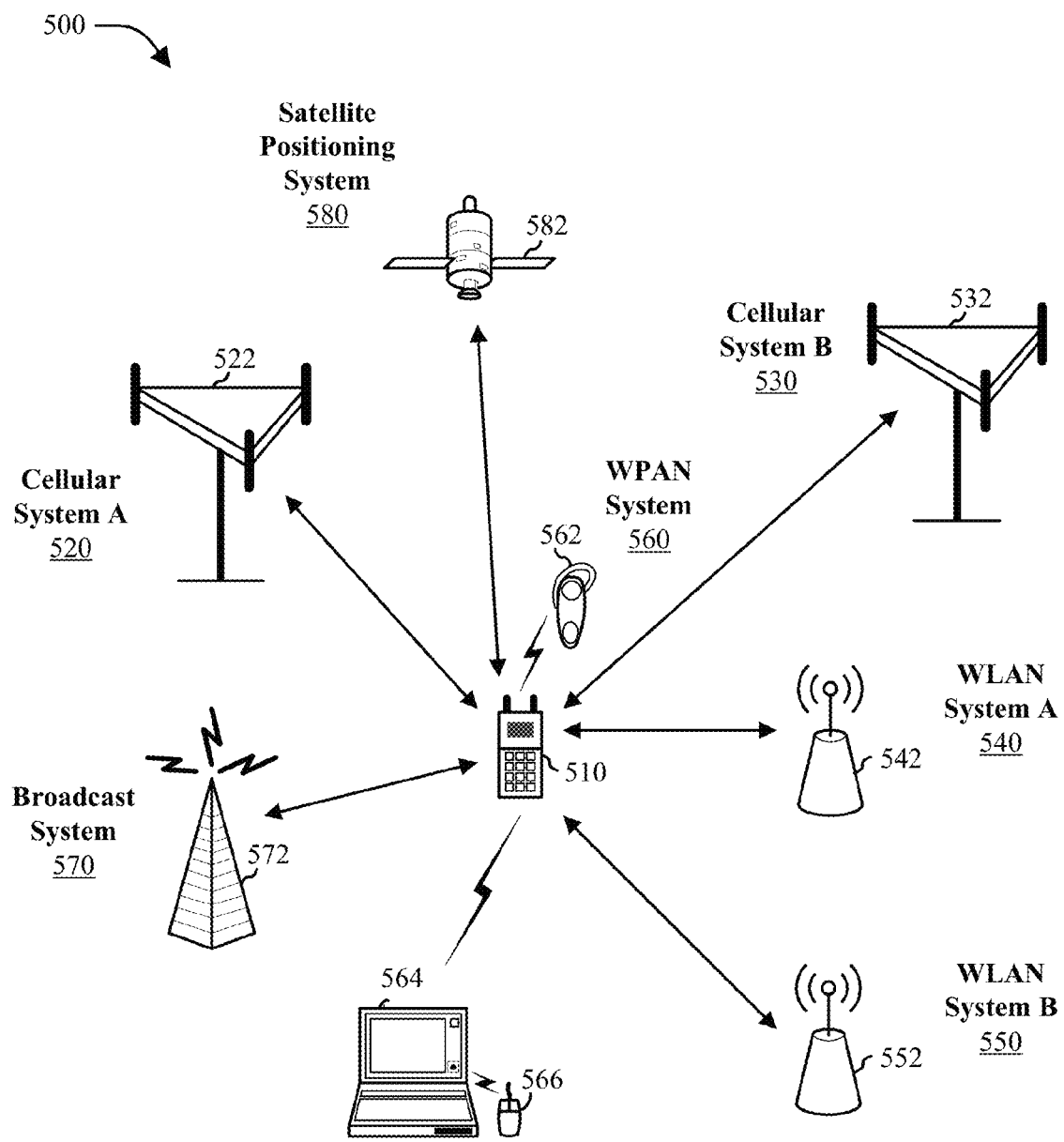
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), CDMA2000, etc. UTRA includes Wideband CDMA (WCDMA) and other variants of CDMA. Moreover, CDMA2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "$3^{rd}$ Generation Partnership Project" (3GPP). CDMA2000 and UMB are described in documents from an organization named "$3^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (Wi-Fi), HIPERLAN, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
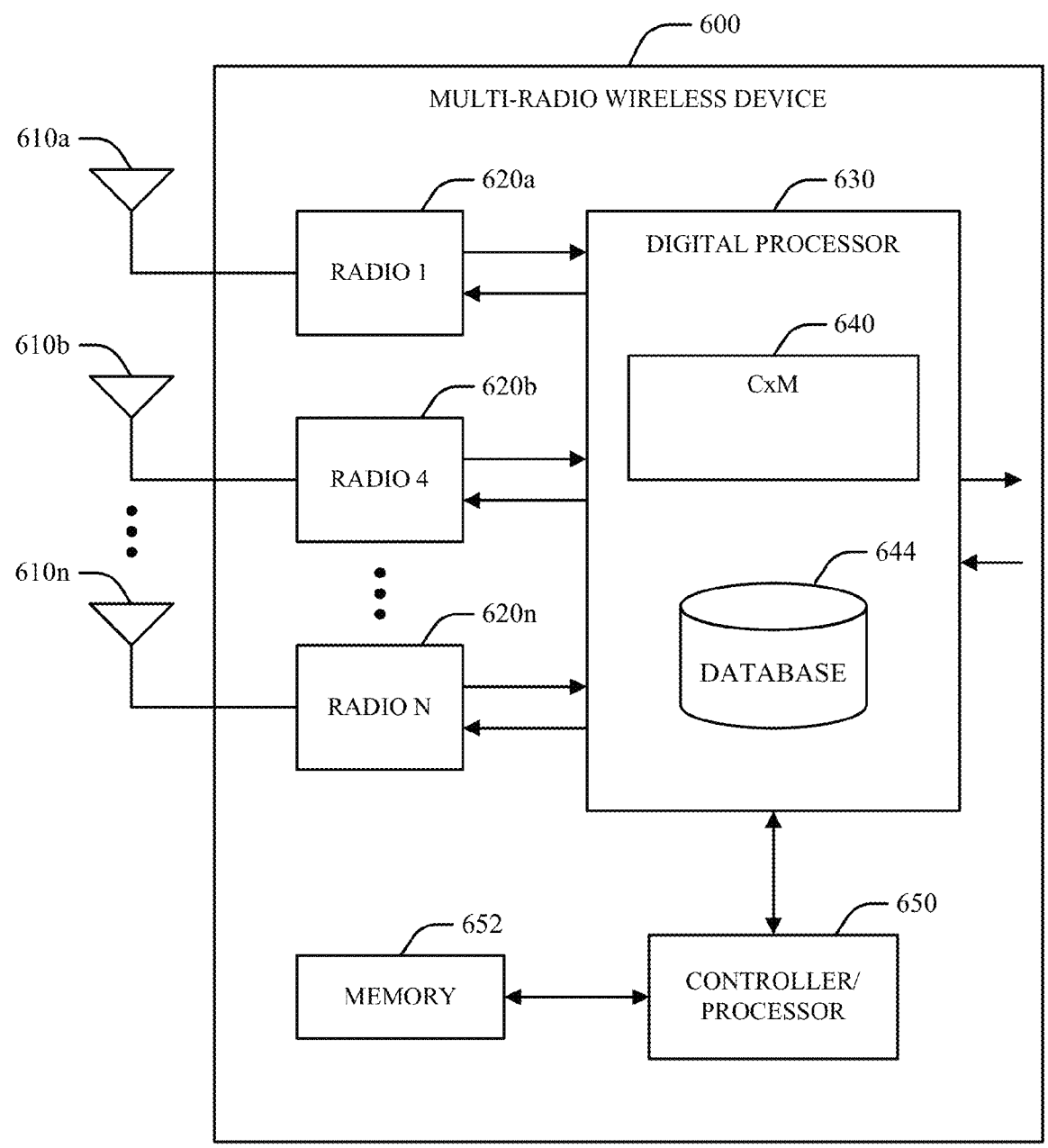
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
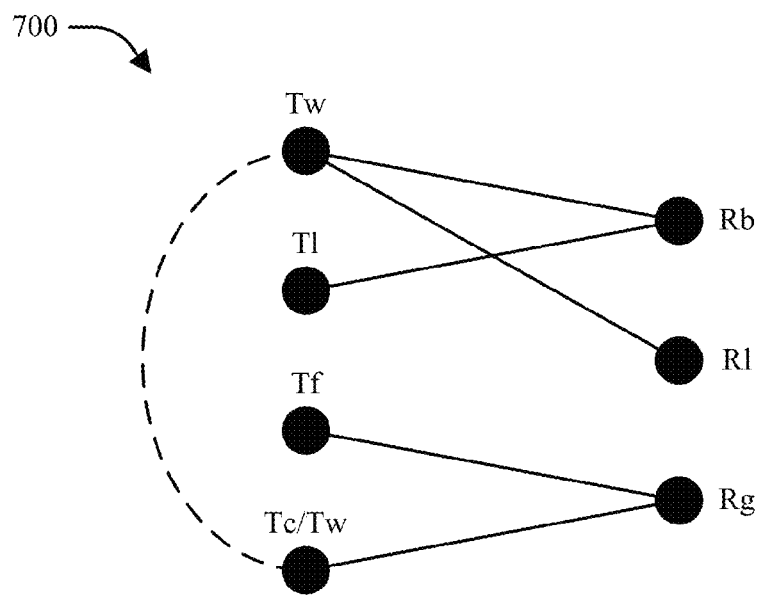
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as those illustrated in FIG. 11. By way of further illustration, a graph 700 in FIG. 7 represents respective potential collisions between seven example radios in a given decision period. In the example shown in graph 700, the seven radios include a WLAN transmitter (Tw), an LTE transmitter (T1), an FM transmitter (Tf), a GSM/WCDMA transmitter (Tc/Tw), an LTE receiver (R1), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (T1) and the Bluetooth receiver (Rb); (3) the WLAN transmitter (Tw) and the LTE receiver (R1); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
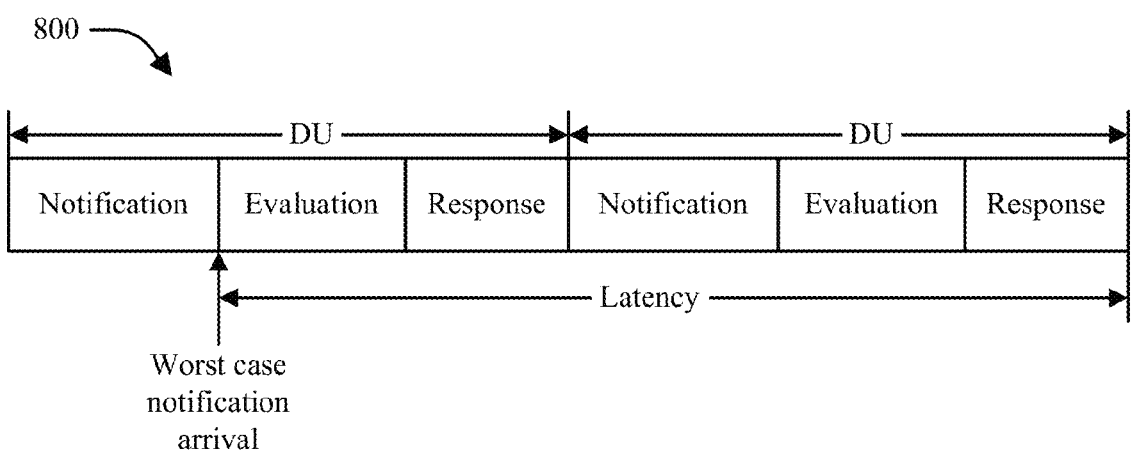
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 μs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
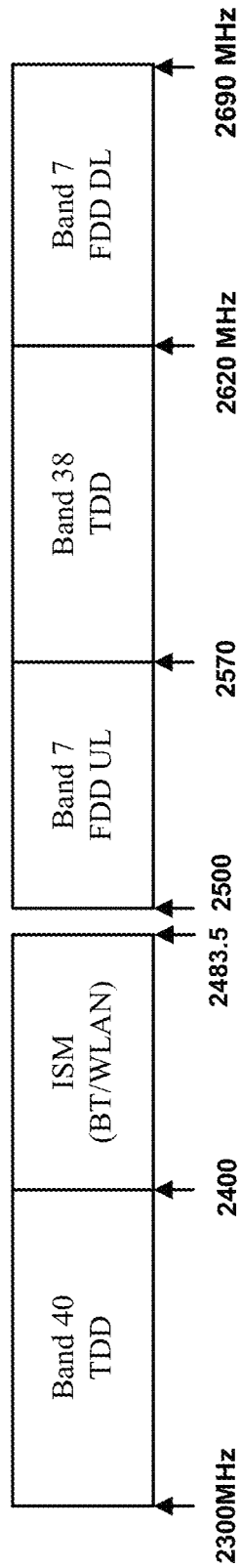
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make interfrequency or inter-RAT handoff decisions to, e.g., move LTE to a channel or RAT with no coexistence issues. It can be appreciated, however, that these existing techniques do not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Bluetooth Packet Scheduling Rules for LTE Coexistence

In particular, Bluetooth or wireless local area network (WLAN) transmissions in the ISM band may interfere with LTE downlink reception. Similarly, LTE uplink transmissions may interfere with downlink receiving by a Bluetooth or WLAN receiver in the ISM band. In one aspect of the disclosure, mitigation of potential interference is achieved by aligning the timing of communication by a Bluetooth radio with communication by an LTE radio of a multi-radio UE. Aligning the timing of communications may be performed by determining available communication resources for a first radio access technology (e.g., Bluetooth/WLAN) according to a timing configuration of a second radio access technology (e.g., LTE). In one aspect of the disclosure, scheduling communications of the first radio access technology to align with the communications of the second radio access technology is performed in accordance with a traffic scheduling rule. In one aspect of the disclosure, the traffic scheduling rule is selected based on the available communication resources and a current radio frequency interference condition between the first and second radio access technologies.

Figure 10:
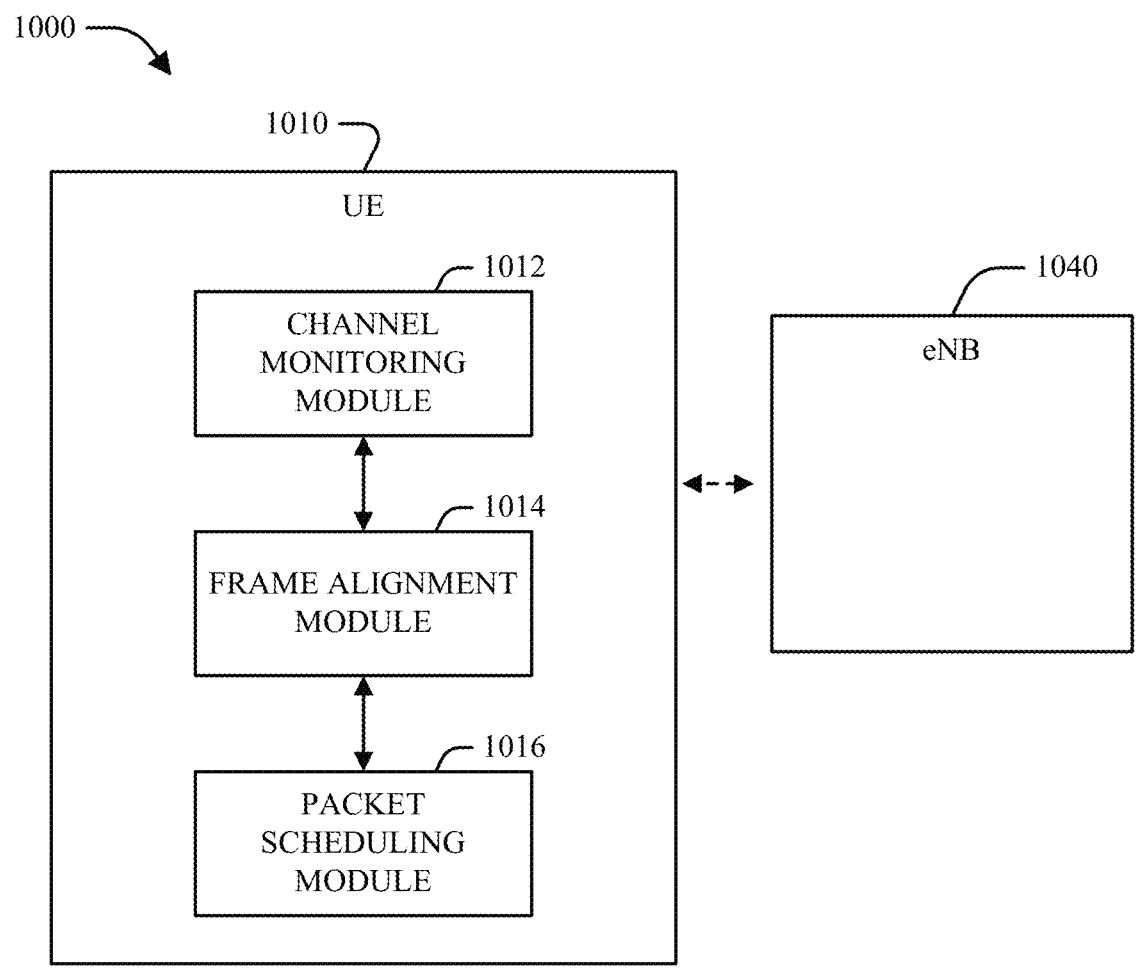
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. For example, a channel monitoring module 1012, a frame alignment module 1014, and a packet scheduling module 1016 can be provided. The various modules 1012-1016 may, in some examples, be implemented as part of a coexistence manager such as the CxM 640 of FIG. 6. The various modules 1012-1016 and others may be configured to implement the aspects discussed herein.

If a LTE transmit frame overlaps with a Bluetooth receive packet, a potential interference to Bluetooth may occur if LTE is transmitting during the Bluetooth receive packet. Similarly, if an LTE receive frame overlaps with a Bluetooth transmit packet, a potential interference to LTE may occur if Bluetooth attempts to transmit data during the LTE receive frame. In one aspect of the present disclosure, a set of scheduling rules may specify operation of a Bluetooth radio to reduce interference with a LTE radio based on a LTE time division duplex (TDD) configuration. In this aspect of the disclosure, the scheduling rules may depend on whether the Bluetooth radio is operating in a slave mode or a master mode.

A Bluetooth device may select the asynchronous connectionless (ACL) packet length for a packet to coordinate Bluetooth transmissions to align with the LTE TDD frame to reduce interference. In TDD LTE, communication frames are divided into an uplink (UL) transmission period and a downlink (DL) receive period and the uplink/downlink periods repeat. In addition, the time for each uplink or downlink period depends on the particular LTE TDD configuration. For example, periodicity for LTE configurations may be either 5 ms or 10 ms. Bluetooth communication slots are 625 μs long. When Bluetooth is operating in ACL mode, a Bluetooth communication packet may be either 1, 3, or 5 slots long. In one aspect of the disclosure, the ACL slot length is selected according to these example values to align Bluetooth transmissions with LTE TDD frames.

In a further aspect of the disclosure, the packet length may also be based on current radio frequency (RF) interference conditions. The RF interference conditions may depend at least in part on whether LTE is scheduled to transmit/receive during any particular frame, or whether Bluetooth is capable of operating on a non-interfering channel. Bluetooth may also perform power back-off (i.e., reduce its transmit power) in situations where potential interference to LTE reception is detected and the scheduling may be modified in conjunction with the power backoff.

Bluetooth behavior may be governed depending on whether the Bluetooth radio is operating in a master mode or a slave mode. In various aspects, Bluetooth behavior when operating as a master may be configured as described below in reference to FIGS. 11-13. In other aspects, Bluetooth behavior when operating as a slave may be configured as described below in reference to FIGS. 14-16. The various configurations of behavior may be described as "rules". As described herein, the various Master Rules and Slave Rules may be collectively referred to herein as "traffic scheduling rules". As used herein, the word "rule" refers to an internal guideline to govern the behavior of communication radios according to aspects of the present disclosure.

Bluetooth Master Rules

Figure 11:
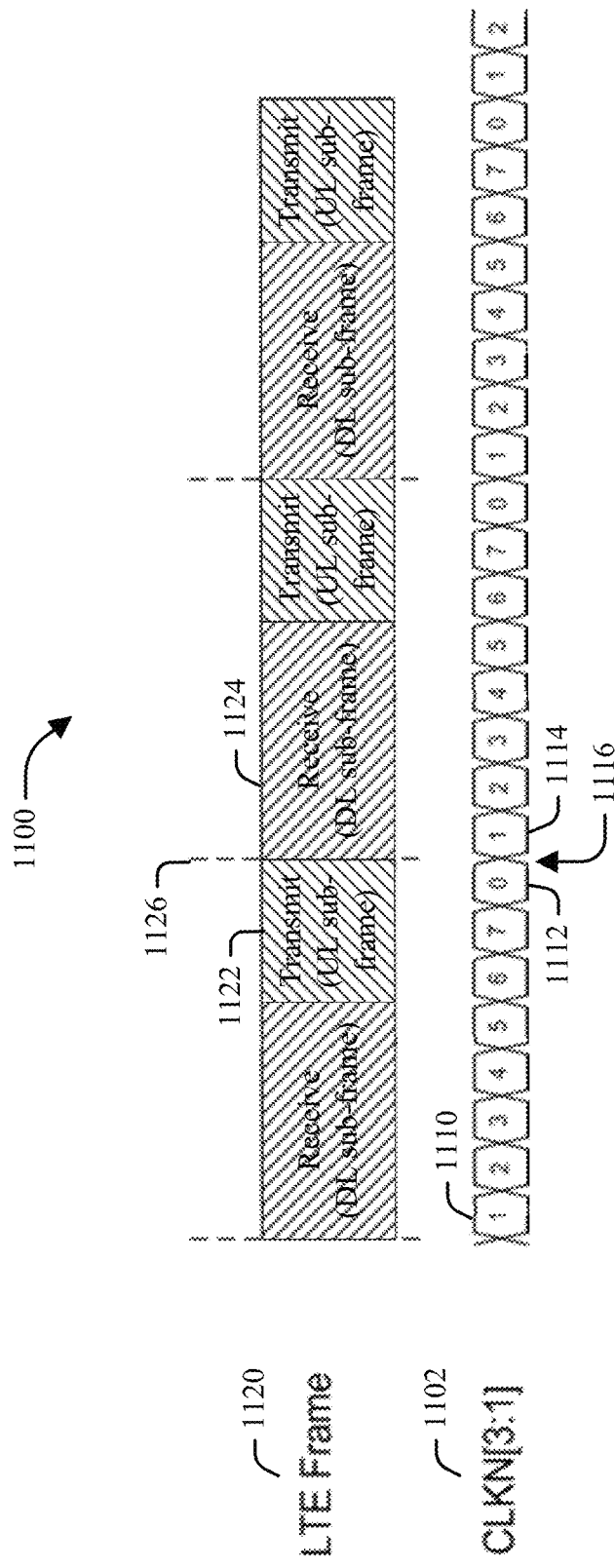
FIG. 11 is a block diagram illustrating alignment between LTE frames and Bluetooth slots for multi-radio coexistence management according to one aspect of the present disclosure.

FIG. 11 includes a block diagram 1100 illustrating alignment between LTE frames 1120 and Bluetooth slots 1110 for multi-radio coexistence management according to one aspect of the present disclosure. As shown in FIG. 11, a multi-radio UE includes a LTE radio and a Bluetooth radio that operates as a master device. Representatively, CLKN 1102 is the Bluetooth native clock, with bits 3:1 of CLKN 1102 being shown to illustrate a slot count. In this configuration, CLKN 1102 is a half-slot clock. In Bluetooth communications, the Bluetooth master devices transmit in even slots and the slave devices transmit in odd slots. In this configuration, the Bluetooth master transmits data during the master transmit slot 1112 and receives data during the slave transmit slot 1114. Similarly, the Bluetooth slave device transmits data during the slave transmit slot 1114 and receives data during the master transmit slot 1112.

One rule for configuring Bluetooth master behavior aligns the boundary 1116 between a Bluetooth master transmit slot 1112 and a Bluetooth slave transmit slot 1114 with the transition 1126 between a LTE transmit (UL) sub-frame 1122 and a LTE receive (DL) sub-frame 1124. As shown in FIG. 11, the Bluetooth master transmit slot "0" 1112 is aligned to the end of the LTE transmit uplink (UL) sub-frame 1122. As the Bluetooth clock 1102 transitions to a slave transmit slot "1" 1114, LTE transitions to the beginning of a receive downlink (DL) sub-frame 1124, as indicated by a transition 1126. Thus, the boundary 1116 between the Bluetooth master transmit slot 1112 to the slave transmit slot 1114 is aligned with the transition 1126 from the LTE transmit sub-frame 1122 to the LTE receive sub-frame 1124. This example for configuration of Bluetooth behavior for a Bluetooth master device is referred to as frame alignment, where the transition 1126 of the LTE frames 1120 aligns with the boundary 1116 of the Bluetooth slots 1110. Such frame alignment may be achieved through any suitable means of configuring Bluetooth and/or LTE communications. This frame alignment guideline may be referred to herein as "Master Rule 1m".

In another aspect, a Bluetooth master may be permitted to transmit during LTE uplink if the start of the next Bluetooth slave transmit slot is in the LTE downlink sub-frame or in an unused LTE uplink sub-frame. This guideline may be referred to herein as "Master Rule 2m(a)". This aspect is illustrated in FIG. 12.

Figure 12:
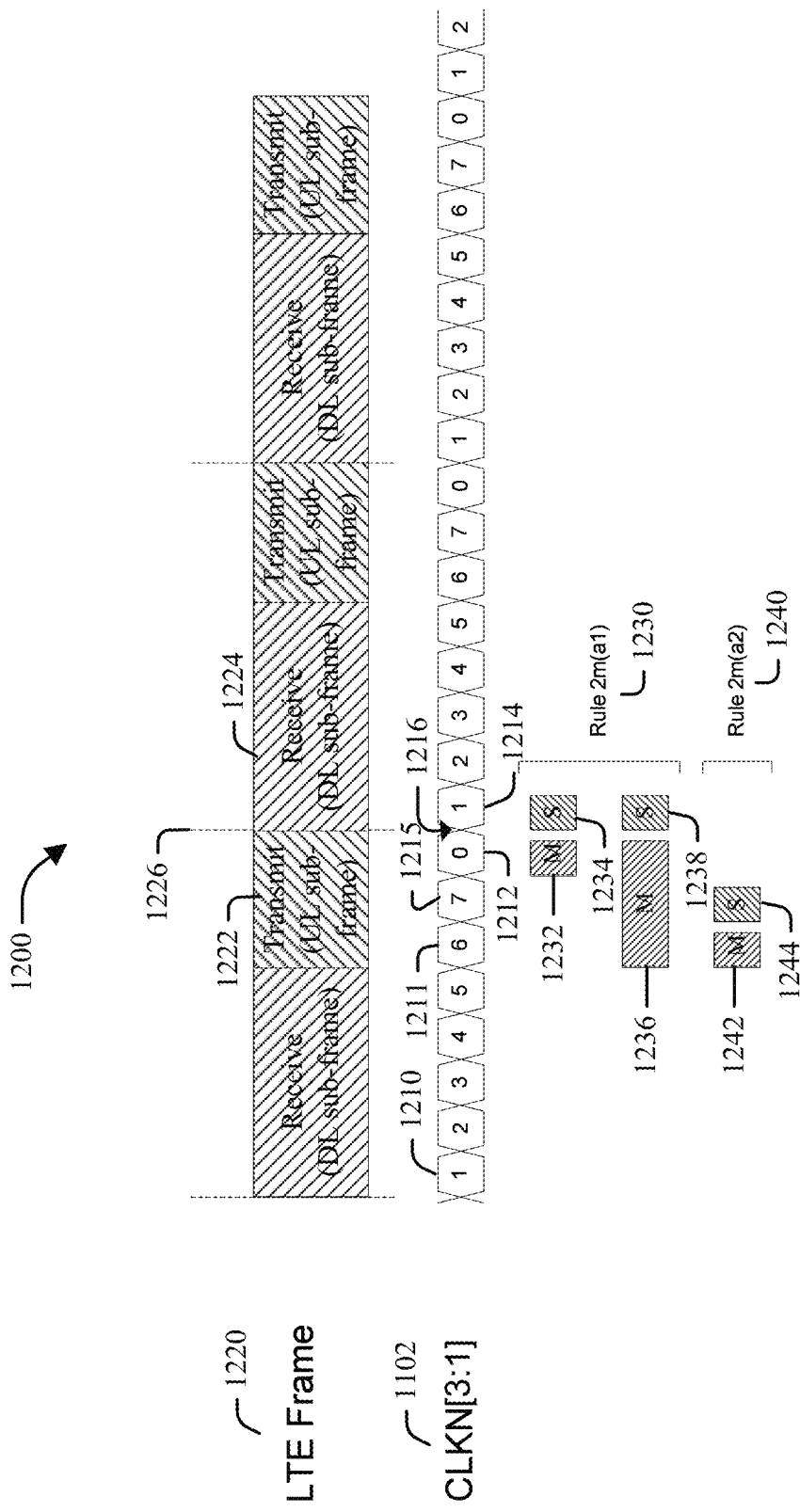
FIG. 12 is a block diagram illustrating the alignment of Bluetooth transmissions with LTE TDD frames according to one aspect of the disclosure.

FIG. 12 is a block diagram of an apparatus 1200 illustrating the alignment of slots 1210 for Bluetooth transmission with LTE TDD frames 1220 according to one aspect of the disclosure. As shown in FIG. 12, the transition 1216 from a Bluetooth master transmit slot 1212 to the slave transmit slot 1214 is aligned with the transition 1226 from LTE transmit sub-frame 1222 to the LTE receive sub-frame 1224. According to Master Rule 2m(a), illustrated in FIG. 12, a representative master transmit slot (shown by the "M" block) 1232 is usable during the LTE uplink sub-frame 1222 if the start of the next slave transmit slot (shown by the "S" block) 1234 is either: (a1) in the LTE downlink sub-frame 1224 (aspect 1230); or (a2) in the LTE uplink sub-frame 1222 when the LTE uplink sub-frame 1222 is unused by LTE (i.e. LTE is not transmitting in that particular uplink sub-frame—aspect 1240). As illustrated in FIG. 12 and described below, Bluetooth transmission or reception using potentially non-interfering channels may be performed according to two subsets of Master Rule 2m, referred to as "Master Rule 2m(a1)" (aspect 1230) and "Master Rule 2m(a2)" (aspect 1240).

In a first example of aspect 1230, a master transmit block M 1232 occurs in Bluetooth slot 0 1212 during the LTE uplink sub-frame 1222 and a slave transmit block S 1234 occurs in Bluetooth slot 1 1214 during the LTE downlink sub-frame 1224. In a second example under aspect 1230, a master transmit block M 1236 occurs from Bluetooth slots 6 to 0 (1211 to 1212) during the LTE uplink sub-frame 1222 and a slave transmit block S 1238 occurs in the Bluetooth slot 1 1214 during the LTE downlink sub-frame 1224. In an example under aspect 1240, a master transmit block M 1242 occurs in Bluetooth slot 6 1211 during the LTE uplink sub-frame 1222 and a slave transmit block S 1244 occurs in Bluetooth slot 7 1215 during an unused LTE uplink sub-frame 1222.

Figure 13:
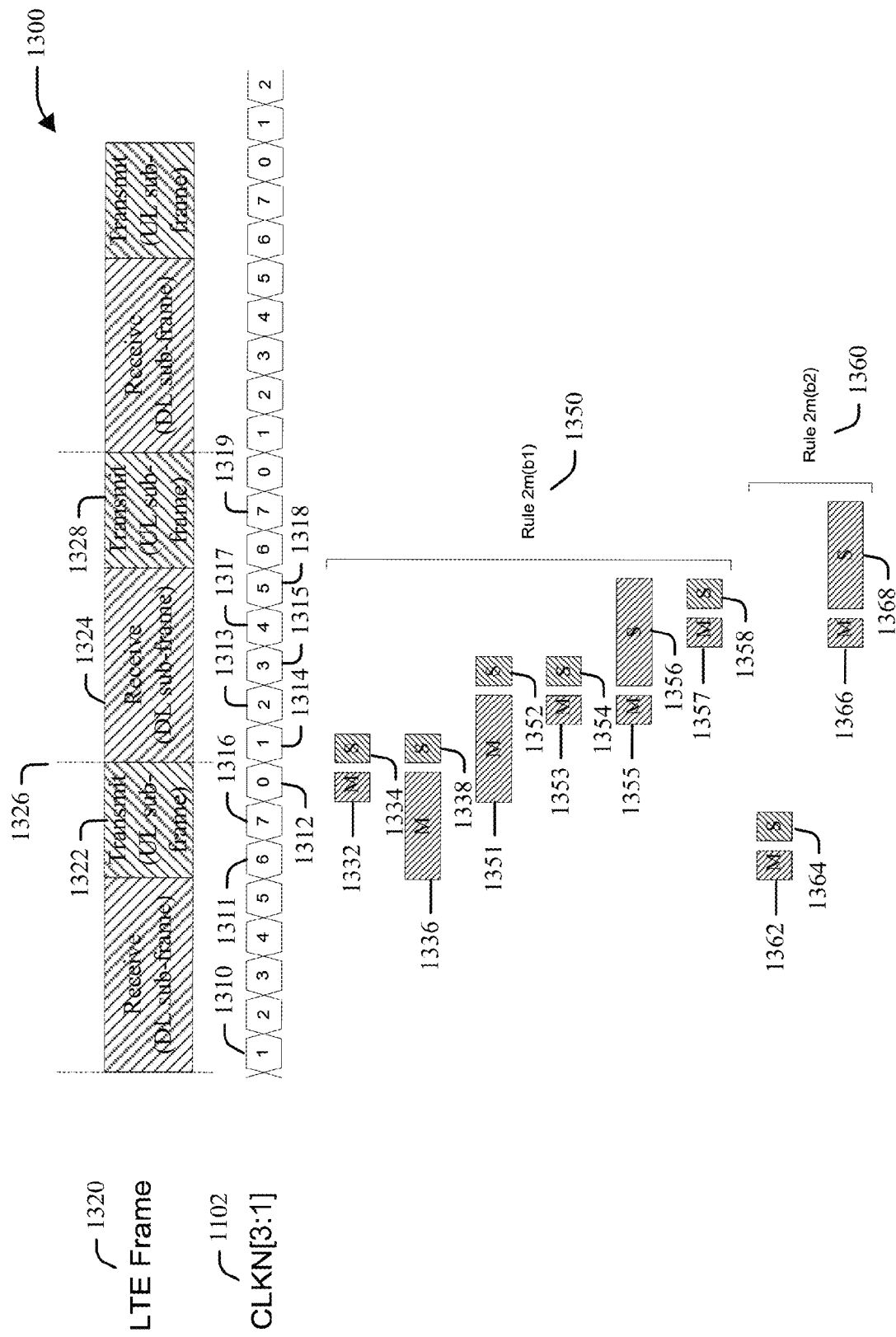
FIG. 13 is a block diagram illustrating coordination of Bluetooth transmissions to align with LTE TDD frames according to a further aspect of the disclosure.

FIG. 13 is a block diagram 1300 illustrating coordination between Bluetooth transmissions 1310 to align with LTE TDD sub-frames 1320 according to a further aspect of the disclosure. In certain cases, all channels may be available for Bluetooth transmission due to channel conditions, radio frequency (RF) conditions, or power backoff of the Bluetooth master device. Power backoff may allow the Bluetooth master to transmit on all channels without causing interference to LTE reception. This guideline for transmission or reception where all channels are available for Bluetooth transmission due to power backoff, but no channels are available for Bluetooth reception may be referred to herein as "Master Rule 2m(b)". As illustrated in FIG. 13 and described below, Bluetooth transmission or reception may be performed according to two subsets of Master Rule 2m(b), referred to as "Master Rule 2m(b1)" (aspect 1350) and "Master Rule 2m(b2)" (aspect 1360).

FIG. 13 illustrates examples of aspect 1350 and aspect 1360 according to the present disclosure. Aspect 1350 (Master Rule 2m(b1)) presumes frame alignment between the boundary 1326 of the LTE sub-frames 1320 and the boundary between the Bluetooth slots 1312 and 1314. In this example, the Bluetooth master transmit blocks are shown by the "M" blocks and slave transmit blocks are shown by "S" blocks. As shown in FIG. 13, a master transmit slot, shown by the "M" block 1332/1336, is usable if the start of the next slave transmit slot, shown by the respective "S" block 1334/1338 is either: (b1) in the LTE downlink sub-frame 1342 (aspect 1350); or (b2) in the LTE uplink sub-frame when the LTE uplink sub-frame is unused (aspect 1360).

The first two examples under aspects 1350 are similar to the first two examples of aspect 1230 (Master Rule 2m(a1)) shown in FIG. 12. In the third example of aspect 1350, a master transmit block M 1351 occurs from Bluetooth slots 0 to 2 (1312 to 1313) during both the LTE uplink sub-frame 1322 and the LTE downlink sub-frame 1324, and a slave transmit block S 1352 occurs in the Bluetooth slot 3 1315 during the LTE downlink sub-frame 1324. In the fourth example of aspect 1350, a master transmit block M 1353 occurs in Bluetooth slot 2 1313 during the LTE downlink sub-frame 1324 and a slave transmit block S 1354 occurs in Bluetooth slot 3 1315 during the LTE downlink sub-frame 1324. In the fifth example of aspect 1350, a master transmit block M 1355 occurs in Bluetooth slot 2 1313 during the LTE downlink sub-frame 1324 and a slave transmit block S 1356 occurs in Bluetooth slots 3-5 1315 to 1318 during the LTE downlink sub-frame 1324. In the sixth example of aspect 1350, a master transmit block M 1357 occurs in Bluetooth slot 4 1317 during the LTE downlink sub-frame 1324 and a slave transmit block S 1358 occurs in Bluetooth slot 5 1318 during the LTE downlink sub-frame 1324.

FIG. 13 also illustrates examples of aspect 1360 (Master Rule 2m(b2)) according to one aspect of the disclosure. In the first example under aspect 1360, a master transmit block M 1362 occurs in Bluetooth slot 6 1311 during both the LTE uplink sub-frame 1322, and a slave transmit block S 1364 occurs in the Bluetooth slot 7 1316 during the LTE uplink sub-frame 1322 because the LTE uplink sub-frame 1322 is unused. In the second example under aspect 1360, a master transmit block M 1366 occurs in Bluetooth slot 4 1317 during the LTE downlink sub-frame 1324 and a slave transmit block S 1368 occurs in Bluetooth slots 5 to 7 (1318 to 1319) during the LTE downlink sub-frame 1324 and the LTE uplink sub-frame 1328 because the LTE uplink sub-frame 1328 is unused.

In certain cases, all channels may be available for Bluetooth transmission or reception. In those cases, no packet scheduling restrictions apply (e.g., no ACL slot length selection). This configuration may be referred to as "Master Rule 2m(c)". In other cases, certain channels are usable by for Bluetooth transmission or reception. If a channel is usable for both Bluetooth transmission and reception, then the all channel aspect Master Rule 2m(c) applies. If a channel is unusable for either Bluetooth transmission or reception, then aspect 1230 (Master Rule 2m(a1)) or 1240 (Master Rule 2m(a2)) applies, where master slots are usable during LTE uplink only if the next slave transmit slot is in the LTE downlink or in an unused LTE uplink sub-frame. If only the receive frequencies are unusable, then aspect 1350 (Master Rule 2m(b1)) or 1360 (Master Rule 2m(b2)) applies, where power backoff may allow the Bluetooth master to transmit on all channels without causing interference to LTE reception. If a coexistence manager (e.g., CxM 640 of FIG. 6) cannot determine the channel in advance, aspect 1230 or 1240 may be used as a default. These variations may be collectively referred to as Master Rule 2m(d).

In a further aspect of the disclosure, a Bluetooth master device may start communication with slave devices during sniff anchor points, for low duty cycle communications. In this aspect of the disclosure, sniff anchor points are selected assuming the LTE uplink sub-frame is used (e.g. schedule the sniff anchor points for the master transmit slot just prior to the LTE uplink to downlink transition).

For certain Bluetooth operations, such as advanced audio distribution profile (A2DP) (a Bluetooth ACL mode used for streaming audio), operation of a Bluetooth master device may be based upon the LTE TDD configuration. TABLE 1 lists the rules which may be used during particular LTE configurations according to one aspect of the disclosure.

TABLE 1

| Config 0 | Config 1 | Config 2 | Config 3 | Config 4 | Config 5 | Config 6 |
| --- | --- | --- | --- | --- | --- | --- |
| Rule 1m & 2m(a) | Rule 1m & 2m(a) | Rule 1m & 2m(b) Bluetooth Transmit Power Back-off | Rule 1m & 2m(b) Bluetooth Transmit Power Back-off | Rule 1m & 2m(b) Bluetooth Transmit Power Back-off | Rule 1m & 2m(b) Bluetooth Transmit Power Back-off | Rule 1m & 2m(a) |

As indicated in TABLE 1, for LTE TDD configurations 2 through 5, where LTE uplink opportunities may be limited, Master Rule 2m(a) may not be used to avoid interfering with LTE uplink. Also, Bluetooth (BT) power back-off may be used to reduce interference between Bluetooth transmission and LTE reception while maintaining desired Bluetooth operation.

Bluetooth Slave Rules

Figure 14:
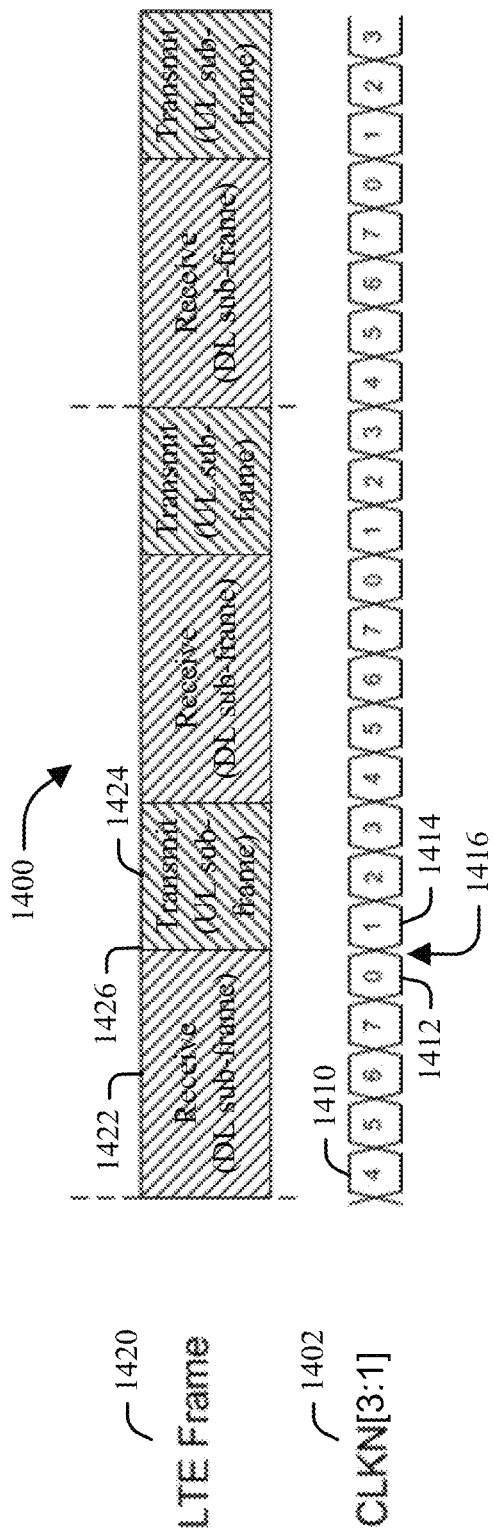
FIG. 14 is a block diagram illustrating alignment between LTE frames and Bluetooth slots for multi-radio coexistence management according to one aspect of the present disclosure.

If a device is operating in a Bluetooth slave mode, the frames may be aligned differently from when the device is operating in a Bluetooth master mode (see FIG. 11). FIG. 14 is a block diagram 1400 illustrating alignment between LTE frames 1420 and Bluetooth slots 1410 for multi-radio coexistence management according to one aspect of the present disclosure. As shown in FIG. 14, Slave Rule 1S aligns the transition 1416 between a Bluetooth master transmit slot 1412 and a Bluetooth slave transmit slot 1414 with the transition 1426 between a LTE receive (down-link (DL)) sub-frame 1422 and a LTE transmit (uplink (UL)) sub-frame 1424. As shown in FIG. 14, the Bluetooth master transmit slot "0" 1412 is aligned to the end of the LTE receive down-link (DL) sub-frame 1422. As the Bluetooth clock 1402 transitions to a slave transmit slot "1" 1414, LTE transitions to the beginning of a transmit uplink (UL) sub-frame 1424. Thus the transition 1416 from the Bluetooth master transmission slot 1412 to the slave transmission slot 1414 is aligned with the transition 1426 from LTE downlink sub-frame (receive) 1422 to LTE uplink sub-frame (transmit) 1424.

Figure 15:
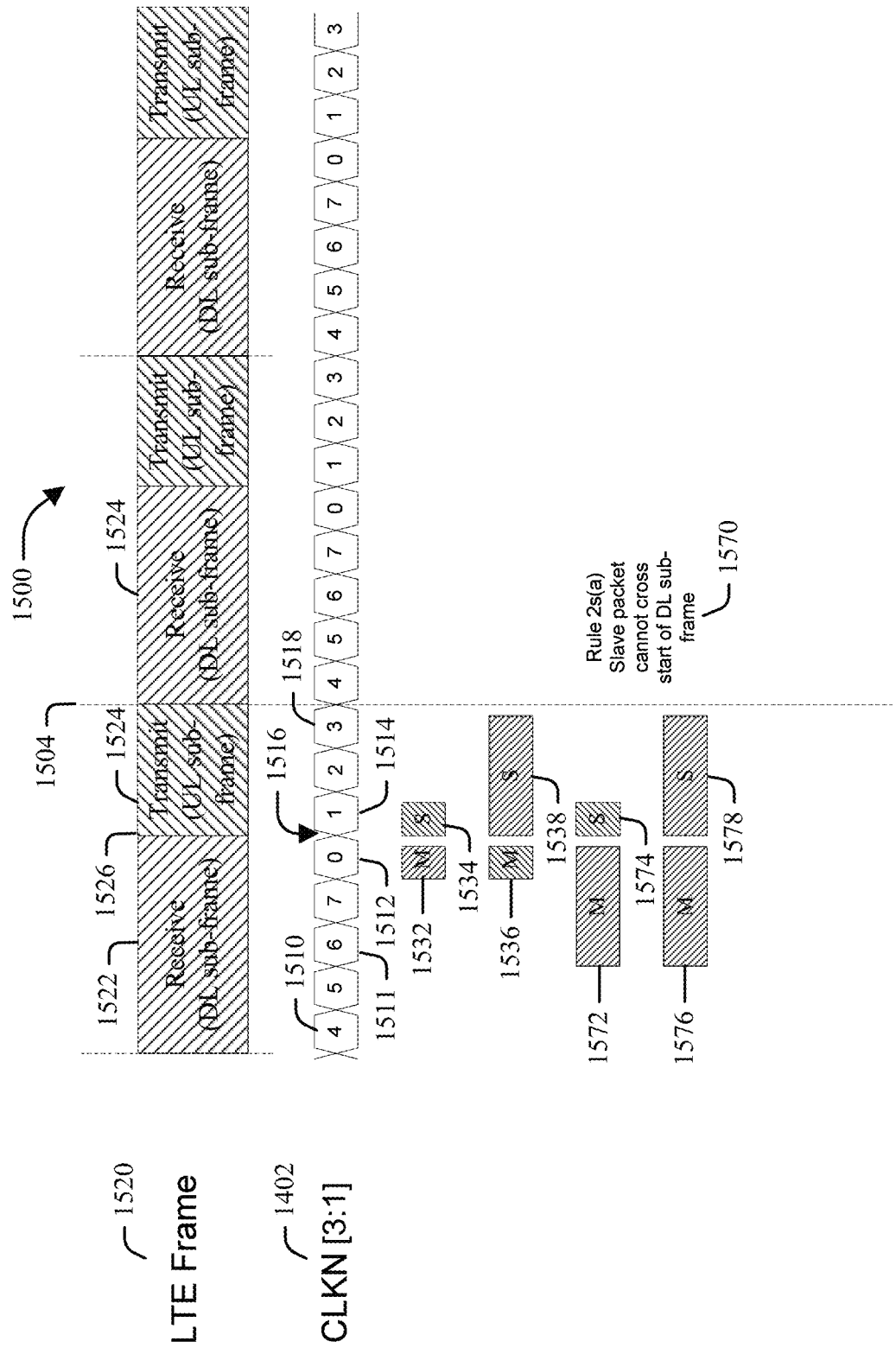
FIG. 15 is a block diagram illustrating the selection of a packet slot length for LTE and Bluetooth multi-radio coexistence management according to one aspect of the present disclosure.

According to one operation configuration of the present disclosure, if potentially no channels are usable by Bluetooth for transmit or receive, the Bluetooth slave may limit the length of transmitted ACL packets to ensure that those packets do not cross the start of the LTE downlink sub-frame. This configuration may be referred to as "Slave Rule 2s(a)". FIG. 15 illustrates examples of Slave Rule 2s(a) acccording to one aspect of the disclosure. Slave Rule 2s(a) (aspect 1570) presumes frame alignment between the boundaries 1526 of LTE frames 1520 and the boundaries 1516 of the Bluetooth slots 1510 (e.g., slots 1512 and 1514). In this example, the Bluetooth master transmit blocks are shown by the "M" blocks and Bluetooth slave transmit blocks are shown by "S" blocks. As shown in FIG. 15, a multi-radio UE includes an LTE radio and a Bluetooth radio that operates in a slave mode. Accordingly, the Bluetooth slave device transmits data during the slave transmit slot 1514 and receives data during the master transmit slot 1512.

As shown in FIG. 15, when no potentially non-interfering channels are available for Bluetooth transmission or reception, the slave limits the length of a transmitted packets (e.g., asynchronous connection-oriented logical transport (ACL) packets) to a predetermined slot length for ensuring that those transmit packets do not cross the transition 1504 to the start of the LTE DL sub-frame 1524. Representatively, examples of Slave Rule 2s(a) 1570 are shown for selection of a slot length for transmit packets according to one aspect of the disclosure. In the first example, a master transmit block M 1532 occurs in Bluetooth slot 0 1512 during the LTE downlink sub-frame 1522 and a slave transmit block S 1534 occurs in Bluetooth slot 1 1514 during the LTE uplink sub-frame 1524. In the second example, a master transmit block M 1536 occurs in a Bluetooth slot 0 1512 during the LTE downlink sub-frame 1522 and a slave transmit block S 1538 occurs in the Bluetooth slots 1-3 1514 to 1518 during the LTE uplink sub-frame 1524.

In the configuration shown in FIG. 15, a slot length of a slave transmit packet is selected to avoid crossing the transition 1504 to the start of the LTE downlink sub-frame 1524. For example, a slot length of the slave transmit packet 1538 is selected to avoiding cross the transition 1504 to the start of the LTE downlink sub-frame 1524 (e.g., a slot length of three (3)). In the third example, a master transmit block M 1572 occurs in Bluetooth slots 6-0 1511 to 1512 during the LTE downlink sub-frame 1522 and a slave transmit block S 1574 occurs in Bluetooth slot 1 1514 during the LTE downlink sub-frame 1522. In the fourth example, a master transmit block M 1578 occurs in Bluetooth slots 6-0 1511 to 1512 during the LTE downlink sub-frame 1522 and a slave transmit block S 1578 occurs in the Bluetooth slots 1-3 1514 to 1518 during the LTE uplink sub-frame 1524.

In certain cases, all channels may be available for Bluetooth transmission due to channel conditions, radio frequency (RF) conditions, or power backoff of the Bluetooth master device. If all channels are usable by Bluetooth for transmission without causing potential interference, but no channels are usable for Bluetooth receive without potential interference, the slave shall choose the packet length (among 1, 3, or 5 slots) such that next master transmit slot is either (b1) in the LTE downlink sub-frame, or (b2) in the next unused LTE uplink sub-frame. The packet length may be chosen independent of payload. This configuration may be referred to as "Slave Rule 2s(b)".

Figure 16A:
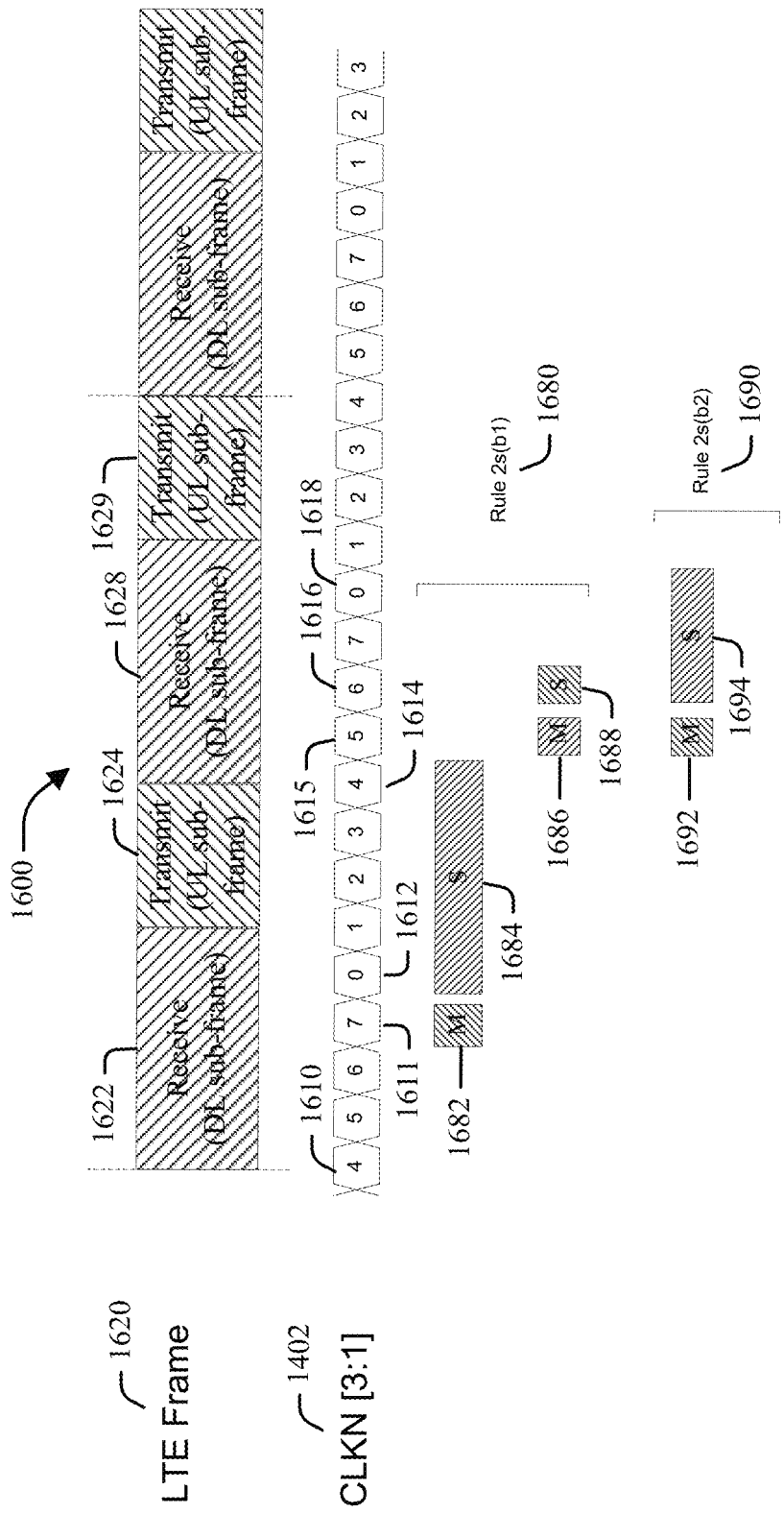
FIGS. 16A-16D are block diagrams illustrating the selection of a packet slot length for LTE and Bluetooth multi-radio coexistence management according to further aspects of the present disclosure.

As illustrated in FIG. 16A and described below, Bluetooth transmission or reception may be performed according to two subsets of Slave Rule 2s(b), referred to as "Slave Rule 2s(b1)" (aspect 1680) and "Slave Rule 2s(b2)" (aspect 1690). Slave Rules 2s(b1) and 2s(b2) may be used without frame alignment.

FIG. 16A is a block diagram 1600 illustrating examples of Slave Rule 2s(b1) 1680 and Slave Rule 2s(b2) 1690 for Bluetooth slave device selection of a transmit packet slot length to according to one aspect of the disclosure. As illustrated, the Bluetooth slave selects a packet length (e.g., 1, 3, or 5 slots) such that next master transmit slot is either: (b1) in the LTE downlink sub-frame (Slave Rule 2s(b1) 1680); or (b2) in the LTE uplink sub-frame when the LTE uplink sub-frame is unused by LTE (Slave Rule 2s(b2) 1690).

In the first example, a master transmit block M 1682 occurs in Bluetooth slot 7 1611 during the LTE downlink (DL) sub-frame 1622 and a slave transmit block S 1684 occurs in Bluetooth slots 0-4 1612 to 1614 during the LTE downlink sub-frame 1622, LTE uplink sub-frame 1624, and the LTE downlink sub-frame 1628. In this example, a slot length of 5 is selected so that a next master transmit block occurs during the LTE downlink sub-frame 1628. In the second example, a master transmit block M 1686 occurs in a Bluetooth slot 5 1615 during the LTE downlink sub-frame 1628 and a slave transmit block S 1688 occurs in the Bluetooth slot 6 1616 during the LTE downlink sub-frame 1628. In the third example under Slave Rule 2s(b2) 1690, a master transmit block M 1692 occurs in a Bluetooth slot 5 1615 during the LTE downlink sub-frame 1628 and a slave transmit block S 1688 occurs in the Bluetooth slots 6-0 1616 to 1618 during the LTE downlink sub-frame 1628. In this example, a slot length of 3 is selected so that a next master transmit slot is within the unused LTE uplink sub-frame 1629.

In certain cases, all channels may be available for Bluetooth transmission or reception. In those cases, no packet scheduling restrictions apply. This slave rule may be referred to as "Slave Rule 2s(c)".

After receiving to a POLL message sent from a remote master device, it is desirable to respond to the POLL message, as a lack of a response may lead the remote device to conclude there is no further data to be sent from the receiving slave mobile device. When responding to a POLL message, the Bluetooth scheduler may choose a packet length based on the contents of the POLL message, the configuration of a second RAT (such as LTE), and the desire to improve the likelihood that a response to the POLL message is received. Slave Rule 2s(d) describes configurations that a mobile device may use when responding to a POLL message.

Figure 16B:
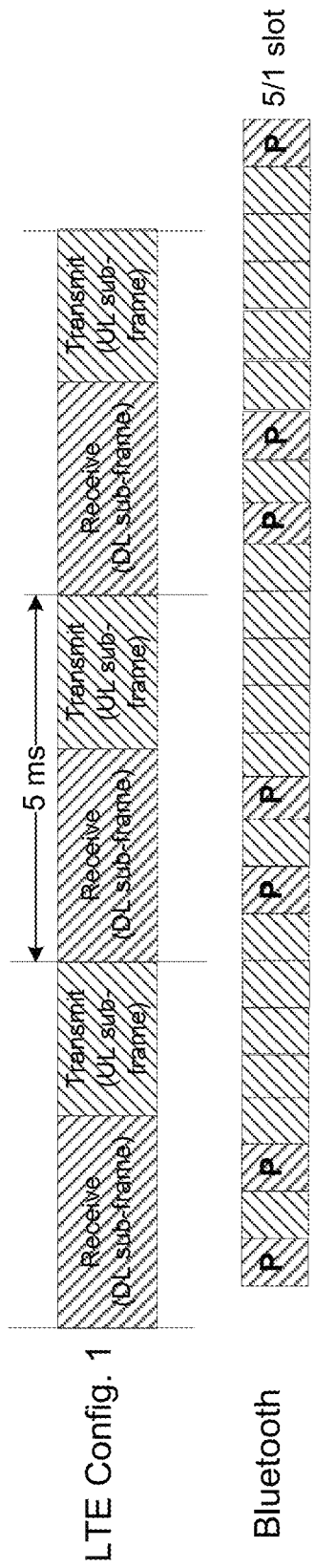
Figure 16C:
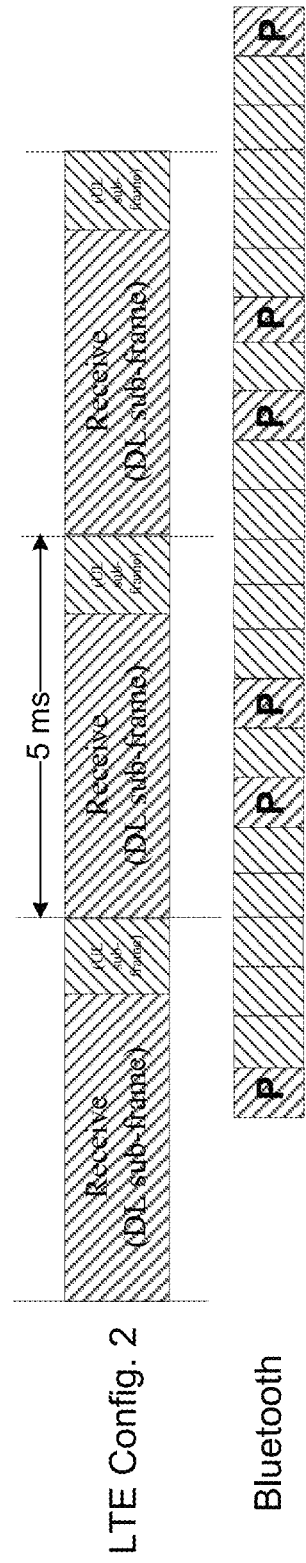
Figure 16D:
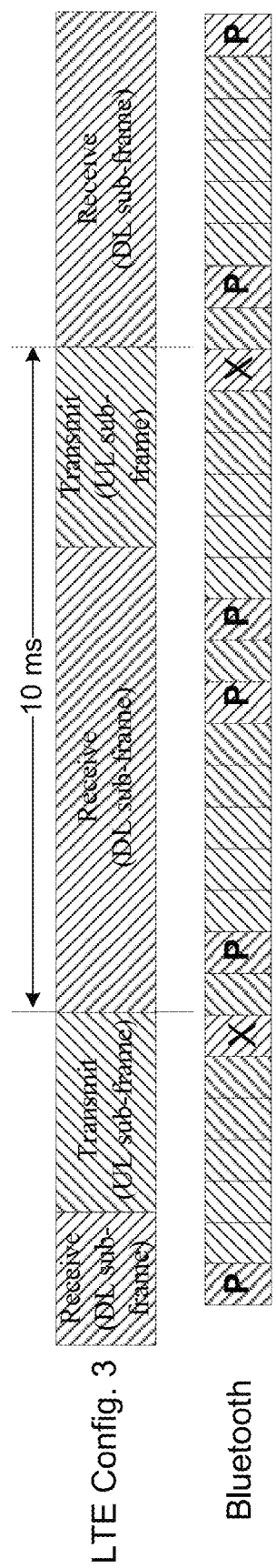

As illustrated in FIG. 16B and described below, Bluetooth POLL response may be performed according to three subsets of Slave Rule 2s(d), referred to as "Slave Rule 2s(d1)", "Slave Rule 2s(d2)", and "Slave Rule 2s(d3)". According to Slave Rule 2s(d1), if a POLL is received and contains an ACK, and the Bluetooth slave has data to send, the new packet length may be chosen to be the longest among 1, 3, or 5 slots such that the next Bluetooth receive communication falls in a desired LTE sub-frame (such as an LTE downlink sub-frame or unused LTE uplink subframe). This part of the rule is the same as 2s(b). In addition, if none of the packet lengths are such that the subsequent receive communication falls within a desired LTE sub-frame (such as, for example, with LTE configuration 0, 3, or 6), a Bluetooth packet length of 5 slots may be chosen. In such a circumstance, a 5 slot packet may result in additional interference or in re-transmissions of the packet due to lost ACKs. For LTE configurations 3 and 6, however, there are subsequent 5 slot opportunities for re-transmissions to be sent such that the ACK is received during a desired LTE sub-frame, as shown in FIG. 16D. A subsequent ACK may be received opportunistically.

According to Slave Rule 2s(d2), if a POLL is received and contains a NACK, and the POLL immediately follows a previous transmit packet which has received explicit NACKs in previous attempts, the same procedure may be applied for choosing a packet length as for Slave Rule 2s(d1). The local slave device may thus repackage the data as the remote master device has not yet used the previous transmit packet.

According to Slave Rule 2s(d3), if a POLL is received and contains a NACK, but does not immediately follows a previous transmit packet, the previous transmit packet may be retransmitted with the same packet length.

As shown in FIG. 16B, when the packet length alternates between 1 and 5 slots and LTE is in configuration 1, implementing Slave Rule 2s(d1) results in the POLL message (indicated by a "P" in the Bluetooth timeline) falling during the LTE downlink sub-frame, for all relative offsets between the LTE frame and Bluetooth slots. This is because as the Bluetooth slots move to the right and poll for the 5 slot packet sees LTE interference, the previous poll opportunity may be used to send the 5 slot packet instead (and the one before that may be used to send the 1 slot packet). FIG. 16C shows a similar timeline for LTE configuration 2. FIG. 16D shows a similar timeline for LTE configuration 3, where Bluetooth slots marked with an "X" may experience interference. If the Bluetooth scheduler encounters a situation where Slave Rule 2s(d) does not allow an ACK to be received (such as with LTE configuration 0), a Bluetooth role switch or LTE power back-off or LTE inter-frequency handover may be implemented.

For certain Bluetooth operations, such as advanced audio distribution profile (A2DP) (a Bluetooth ACL mode used for streaming audio), operation of a Bluetooth (BT) slave device may be based upon the LTE TDD configuration. TABLE 2 lists the rules which may be used to configure a Bluetooth slave device during particular LTE configurations.

As indicated in TABLE 2, for LTE TDD configurations 0 through 6, Bluetooth (BT) power back-off may be used to reduce interference between Bluetooth transmission and LTE reception while maintaining desired Bluetooth operation.

Figure 17:
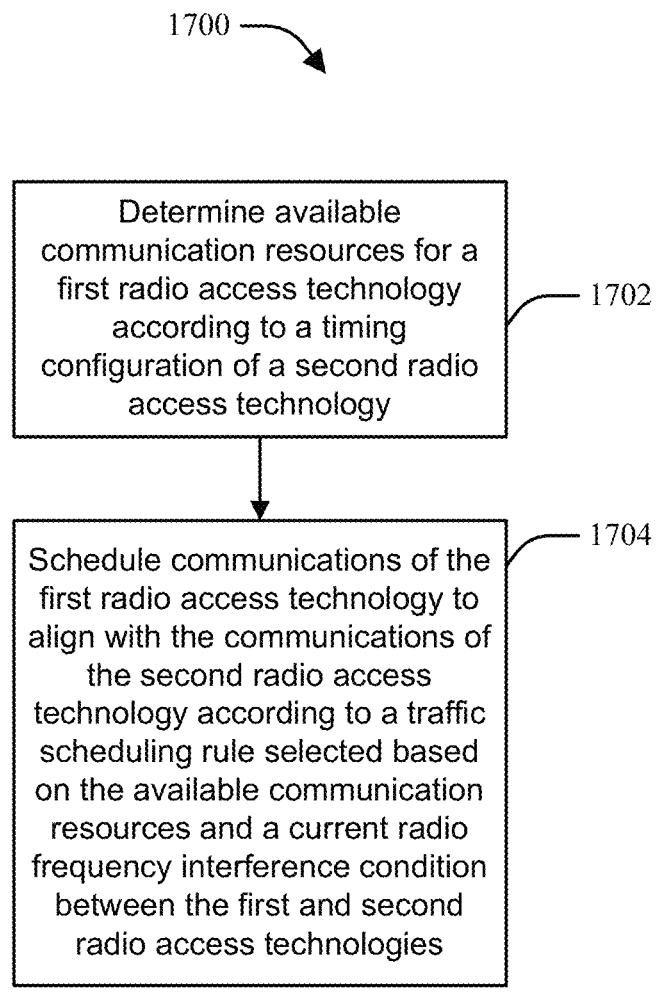
FIG. 17 is a block diagram illustrating a method for Bluetooth packet scheduling for LTE coexistence according to one aspect of the present disclosure.

As shown in FIG. 17, a coexistence manager may determine Bluetooth packet scheduling rules for LTE coexistence according to the method 1700 in one aspect of the present disclosure. As shown in block 1702, the coexistence manager may determine available communication resources for a first radio access technology according to a timing configuration of a second radio access technology. The coexistence manager may also schedule communications of the first radio access technology, as shown in block 1704. In one aspect, a traffic scheduling rule is selected based on the available communication resources and a current radio frequency interference condition between the first and second radio access technologies.

Figure 18:
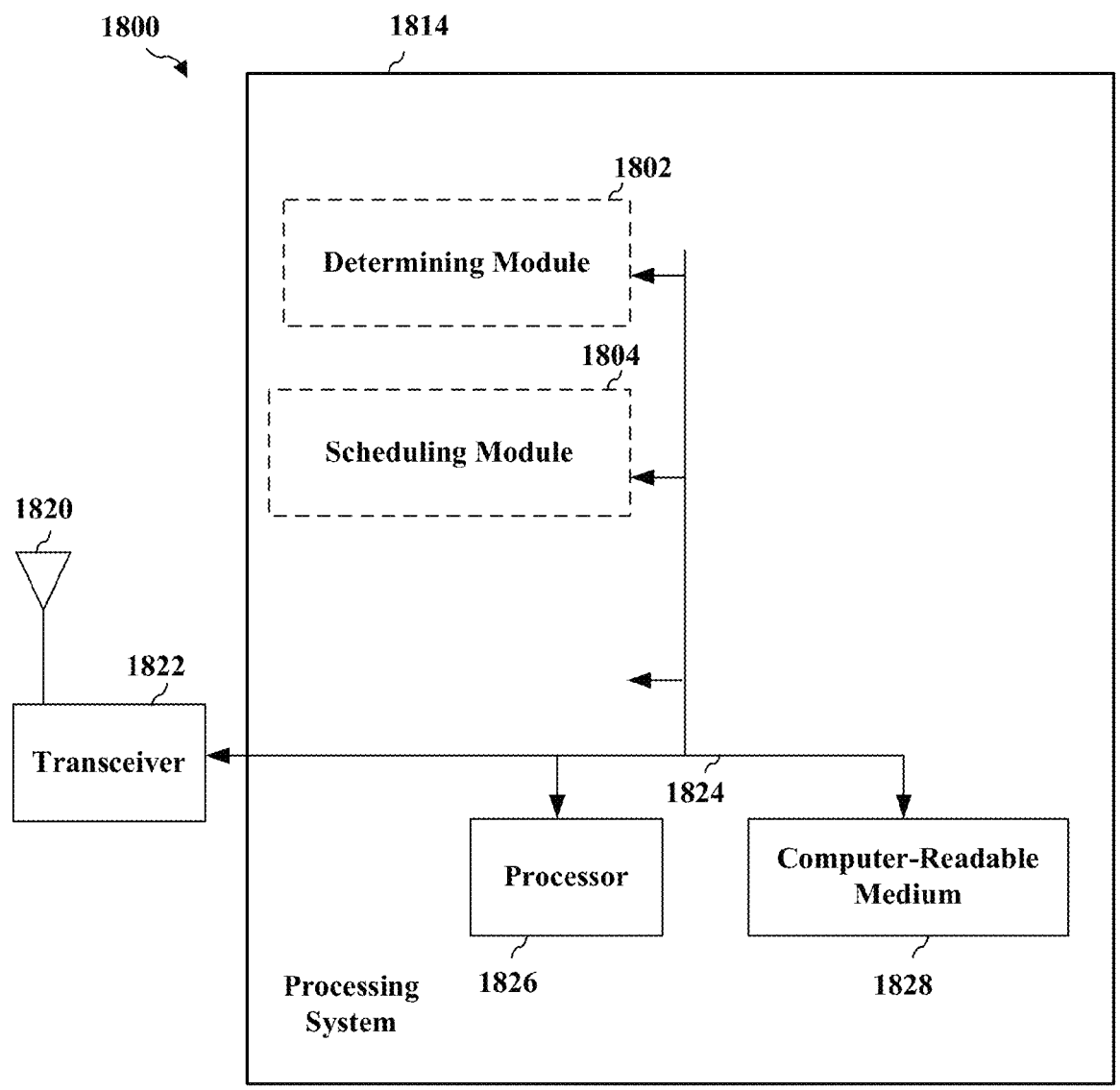
FIG. 18 is a block diagram illustrating components for Bluetooth packet scheduling for LTE coexistence according to one aspect of the present disclosure.

FIG. 18 is a diagram illustrating an example of a hardware implementation for an apparatus 1800 employing a coexistence messaging system 1814. The coexistence messaging system 1814 may be implemented with a bus architecture, represented generally by a bus 1824. The bus 1824 may include any number of interconnecting buses and bridges depending on the specific application of the coexistence messaging system 1814 and the overall design constraints. The bus 1824 links together various circuits including one or more processors and/or hardware modules, represented by a processor 1826, a determining module 1802, a scheduling module 1804, and a computer-readable medium 1828. The bus 1824 may also link various other circuits such as timing sources, peripherals, voltage regulators, and power management circuits, which are well known in the art, and therefore, will not be described any further.

The apparatus includes the coexistence messaging system 1814 coupled to a transceiver 1822. The transceiver 1822 is coupled to one or more antennas 1820. The transceiver 1822 provides a means for communicating with various other apparatus over a transmission medium. The coexistence messaging system 1814 includes the processor 1826 coupled to the computer-readable medium 1828. The processor 1826 is responsible for general processing, including the execution of software stored on the computer-readable medium 1828. The software, when executed by the processor 1826, causes the coexistence messaging system 1814 to perform the various functions described above for any particular apparatus. The computer-readable medium 1828 may also be used for storing data that is manipulated by the processor 1826 when executing software. The coexistence messaging system 1814 further includes the determining module 1802 for determining the cellular transmit and receive frequency bands used for cellular communication.

The coexistence messaging system 1814 includes a determining module 1802 for determining available communication resources for a first radio access technology according to a timing configuration of a second radio access technology.

TABLE 2

| Config 0 | Config 1 | Config 2 | Config 3 | Config 4 | Config 5 | Config 6 |
|---|---|---|---|---|---|---|
| Rule 2S(b) or 2S(d) & Bluetooth Transmit Power Back-off | Rule 2S(b) or 2S(d) & BT Transmit Power Back-off | Rule 2S(b) or 2S(d) & BT Transmit Power Back-off | Rule 2S(b) or 2S(d) & BT Transmit Power Back-off | Rule 2S(b) or 2S(d) & BT Transmit Power Back-off | Rule 2S(b) or 2S(d) & BT Transmit Power Back-off | Rule 2S(b) or 2S(d) & BT Transmit Power Back-off |

The coexistence messaging system 1814 further includes a scheduling module 1804 for scheduling communications of the first radio access technology to align with the communications of the second radio access technology. The determining module 1802 and the scheduling module 1804 may be software modules running in the processor 1826, resident/stored in the computer-readable medium 1828, one or more hardware modules coupled to the processor 1826, or some combination thereof. The coexistence messaging system 1814 may be a component of the UE 250 and may include the memory 272 and/or the processor 270.

In one aspect of the disclosure, scheduling of communications ensures that uplink communications of a first RAT (radio access technology) occur when uplink communications of the second RAT occur, and downlink communications of the first RAT occur when communications of the second RAT occur. In one configuration, the scheduling of communications is performed in accordance with a traffic scheduling rule that is selected based on the available communication resources and a current radio frequency interference condition between the first and second radio access technologies.

In one configuration, the apparatus 1800 for wireless communication includes means for determining and means for scheduling. The means may be the determining module 1802, the scheduling module 1804, the channel monitoring module 1012, the frame alignment module 1014, the packet scheduling module 1016, the coexistence manager 640, and/or the coexistence messaging system 1814 of the apparatus 1800 configured to perform the functions recited by the determining means. As described above, the determining means may also include antenna 252, receiver 254, receive data processor 260, processor 270, and/or memory 272. The scheduling means may also include the antenna 252, receiver 254, transmit data processor 238, the processor 270, and/or memory 272. In another aspect, the aforementioned means may be any module or any apparatus configured to perform the functions recited by the aforementioned means.

The examples describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
   operating a clock for managing communications between a master and a slave of a Bluetooth radio access technology;
   determining a frame alignment between a boundary of a slot of the Bluetooth radio access technology and a boundary of a subframe of a Long Term Evolution (LTE) radio access technology;
   determining available communication resources of the Bluetooth radio access technology relative to communications of the LTE radio access technology based at least in part on the clock, the frame alignment, and a timing configuration for the LTE radio access technology, in which:

the timing configuration indicates timing of uplink subframes and downlink subframes of the LTE radio access technology, and a master transmit slot of the Bluetooth radio access technology is determined to be available when a start of a next slave transmit slot of the Bluetooth radio access technology coincides with an LTE downlink subframe or an unused LTE uplink subframe;

permitting a first communication in the master transmit slot based on the determination that the master transmit slot is available as a result of the start of the next slave transmit slot; and choosing a slave transmit packet length based on an acknowledgment status related to a previous poll transmission.

2. The method of claim 1 comprising:

adjusting a transmit power of the Bluetooth radio access technology to reduce interference between the Bluetooth radio access technology and the LTE radio access technology.

3. The method of claim 1 comprising:

adjusting a transmit power of the LTE radio access technology to reduce interference between the LTE radio access technology and the Bluetooth radio access technology.

4. The method of claim 1 further comprising:

selecting a transmit packet length of a previous slave transmit slot, the previous slave transmit slot occurring before the master transmit slot, to align the master transmit slot with a downlink subframe of the LTE radio access technology.

5. The method of claim 1 in which:

a first communication time slot comprises a slave-to-master transmission slot;

and further comprising selecting a transmit packet length of a previous slave transmit slot, the previous slave transmit slot occurring before the master transmit slot, to align the master transmit slot with an uplink subframe of the LTE radio access technology when the uplink subframe is unused.

6. The method of claim 1 further comprising:

selecting a transmit packet length of at least one slave-to-master transmission of the Bluetooth radio access technology to align a start slot of a transmit packet to an uplink subframe of the LTE radio access technology.

7. The method of claim 1 further comprising:

comparing a transmit power of the Bluetooth radio access technology with a threshold transmit power; and increasing a number of available communication resources for the Bluetooth radio access technology when the transmit power is below the threshold transmit power.

8. An apparatus configured for operation in a wireless communication network, the apparatus comprising:

a memory; and at least one processor coupled to the memory, the at least one processor being configured:

to operate a clock for managing communications between a master and a slave of a Bluetooth radio access technology;

to determine a frame alignment between a boundary of a slot of the Bluetooth radio access technology and a boundary of a subframe of a Long Term Evolution (LTE) radio access technology;

to determine available communication resources of the Bluetooth radio access technology relative to communications of the LTE radio access technology based at least in part on the clock, the frame alignment, and a timing configuration for the LTE radio access technology, in which:

the timing configuration indicates timing of uplink subframes and downlink subframes of the LTE radio access technology, and a master transmit slot of the Bluetooth radio access technology is determined to be available when a start of a next slave transmit slot of the Bluetooth radio access technology coincides with an LTE downlink subframe or an unused LTE uplink subframe;

to permit a first communication in the master transmit slot based on the determination that the master transmit slot is available as a result of the start of the next slave transmit slot; and to choose a slave transmit packet length based on an acknowledgment status related to a previous poll transmission.

9. The apparatus of claim 8 in which the processor is further configured:

to adjust a transmit power of the Bluetooth radio access technology to reduce interference between the Bluetooth first radio access technology and the LTE radio access technology.

10. The apparatus of claim 8 in which the processor is further configured to:

to adjust a transmit power of the LTE radio access technology to reduce interference between the LTE radio access technology and the Bluetooth radio access technology.

11. The apparatus of claim 8 in which the processor is further configured to:

select a transmit packet length of a previous slave transmit slot, the previous slave transmit slot occurring before the master transmit slot, to align the master transmit slot with a downlink subframe of the LTE radio access technology.

12. The apparatus of claim 8 in which the processor is further configured to:

select a transmit packet length of a previous slave transmit slot, the previous slave transmit slot occurring before the master transmit slot, to align the master transmit slot with an uplink subframe of the LTE radio access technology when the uplink subframe is unused.

13. The apparatus of claim 8 in which the processor is further configured to select a transmit packet length of at least one slave-to-master transmission of the Bluetooth radio access technology to align a start slot of a transmit packet to an uplink subframe of the LTE radio access technology.

14. The apparatus of claim 8 in which the processor is further configured:

to compare a transmit power of the Bluetooth radio access technology with a threshold transmit power; and to increase a number of available communication resources for the Bluetooth radio access technology when the transmit power is below the threshold transmit power.

15. A computer program product configured for wireless communication, the computer program product comprising:

a non-transitory computer-readable medium having non-transitory program code recorded thereon, the program code comprising:

program code to operate a clock for managing communications between a master and a slave of a Bluetooth radio access technology;

program code to determine a frame alignment between a boundary of a slot of the Bluetooth radio access technology and a boundary of a subframe of a Long Term Evolution (LTE) radio access technology;

program code to determine available communication resources of the Bluetooth radio access technology relative to communications of the LTE radio access technology based at least in part on the clock, the frame alignment, and a timing configuration for the LTE radio access technology, in which:
   the timing configuration indicates timing of uplink subframes and downlink subframes of the LTE radio access technology, and
   a master transmit slot of the Bluetooth radio access technology is determined to be available when a start of a next slave transmit slot of the Bluetooth radio access technology coincides with an LTE downlink subframe or an unused LTE uplink subframe;
program code to permit a first communication in the master transmit slot based on the determination that the master transmit slot is available as a result of the start of the next slave transmit slot; and
program code to choose a slave transmit packet length based on an acknowledgment status related to a previous poll transmission.

16. An apparatus operable in a wireless communication system, the apparatus comprising:
means for operating a clock for managing communications between a master and a slave of a Bluetooth radio access technology;
means for determining a frame alignment between a boundary of a slot of the Bluetooth radio access technology and a boundary of a subframe of a Long Term Evolution (LTE) radio access technology;
means for determining available communication resources of the Bluetooth radio access technology relative to communications of the LTE radio access technology based at least in part on the clocks the frame alignment, and a timing configuration for the LTE radio access technology, in which:
   the timing configuration indicates timing of uplink subframes and downlink subframes of the LTE radio access technology, and
   a master transmit slot of the Bluetooth radio access technology is determined to be available when a start of a next slave transmit slot of the Bluetooth access technology coincides with an LTE downlink subframe or an unused LTE uplink subframe;
means for permitting a first communication in the master transmit slot based on the determination that the master transmit slot is available as a result of the start of the next slave transmit slot; and
means for choosing a slave transmit packet length based on an acknowledgment status related to a previous poll transmission.

\* \* \* \* \*